Patented May 22, 1951

2,553,777

UNITED STATES PATENT OFFICE 2,553,777

PARASITICIDAL COMPOSITIONS CONTAINING SUBSTITUTED DITHIOTRICHLORO METHANES

Roger S. Hawley, Linden, and Allen R. Kittleson, Cranford, N. J., assignors to Standard Oil Development Company, a corporation of Delaware No Drawing. Application November 8, 1949, Serial No. 126,252

14 Claims. (Cl. 167—22)

This invention relates to new and useful improvements in parasiticidal preparations and more particularly to improved fungicides and insecticides. This invention also relates to methods of protecting organic material subject to attack by low orders of organisms. More specifically, this invention relates to the preparation of new chemical compounds, substituted dithiotrichloro methanes.

It has now been found that substituted dithiotrichloro methanes, i. e., compounds containing the —S—S—CCl$_3$ group are extremely effective for checking the growth of insects and fungi. These compounds may thus be used as novel ingredients of parasiticidal compositions.

Particularly effective compounds of the indicated type are illustrated in Formula I below:

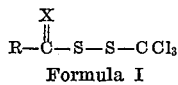

Formula I where R is a radical selected from the group consisting of alkyl, alkylthio (RS) and alkoxy, and X is a radical selected from the group consisting of —S— and —O—. Where R is an alkyl group and X is an oxygen radical, the compounds of this invention under conventional nomenclature are trichloromethyl acyl disulfides. When R is an alkoxy group and X is S, the compounds are trichloromethylthio esters of xanthic acids. When R is an alkylthio group and X is S, the compounds are trichloromethylthio esters of thioxanthic acids.

Substituted derivatives of R may also be used in the parasiticidal compositions of this invention as it is the —S—S—CCl$_3$ group which is believed to give the compounds their physiological activity. The additional substituent groups on the R radical may thus be alkyl, aryl, halogen, etc.

Thus, compounds wherein the R radical contains from 1 to 8 carbon atoms, inclusive, are especially effective. Some of the compounds of this preferred type contain the following alkyl radicals as the R group: methyl, ethyl, propyl, isopropyl, n-butyl, isooctyl, etc. These alkyl radicals are the ones incorporated also in the alkoxy and alkylthio radicals.

Especially effective and desirable compounds of this invention are: trichloromethyl acetyl disulfide, the trichloromethylthio ester of ethyl xanthic acid, the trichloromethylthio ester of n-butyl thioxanthic acid and trichloromethylphenyl disulfide.

The compounds of this invention which are believed to be novel may be prepared in general by the condensation reaction of perchloromethyl mercaptan with the corresponding sulfur-containing acid or salt, i. e., alkanethiolic acid or salt, xanthate salt or thioxanthate salt. The perchloromethylmercaptan can be reacted with the acid or sodium salt of the alkanethiolic acid to secure the compounds of this invention but is reacted only with the salts of the xanthic and thioxanthic acids. Formula II represents the reaction between thio acetic acid and perchloromethylmercaptan.

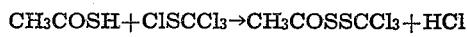

Formula II

The acid or acid salts to be reacted with perchloromethylmercaptan may first be dissolved in water or may be dissolved or suspended in a suitable solvent such as benzene, toluene, or dioxane.

An approximately equimolar amount of perchloromethylmercaptan is then aded with stirring while the temperature is maintained at about atmospheric. When water is used as the reaction medium, the desired product is filtered off or extracted with a solvent such as diethyl ether and is then concentrated by evaporation of the solvent. When a solvent such as benzene or dioxane is used as the reaction medium, the desired product is isolated from the solvent by filtration or by distillation.

The preparation of the alkanethiolic acids used as reactants is well-known in the art and need not be given here.

The preparation of the xanthate and thioxanthate salts reacted with the perchloromethylmercaptan is also known in the art (Richter's "Organic Chemistry," 3rd ed., pages 487–490).

The xanthate salts are thus prepared in general by the reaction of the corresponding alcohol, carbon disulfide, and aqueous sodium hydroxide. The thioxanthate salts are prepared in a similar manner as the xanthate salts except that the mercaptan is utilized instead of the alcohol. The mercaptans employed may be pure or from relatively impure sources such as petroleum refinery streams.

The following examples are given to illustrate this invention and include both the preparation of the substituted dithiotrichloro methanes of this invention, and test results obtained on the active compounds used as parasiticides.

*Example 1.—Preparation of trichloromethyl acetyl disulfide*

Trichloromethyl acetyl disulfide was prepared by placing 7.61 gms. (0.1 mole) of thioacetic acid in a 125 cc. Erlenmeyer flask and adding dropwise 18.6 gms. (0.1 mole) of perchloromethylmercaptan. The reaction temperature was kept below 50° C. with an ice-water bath. After all the perchloromethylmercaptan had been added and the temperature was lowered to about 25° C., ethyl ether was added and the solution was water washed until free of Cl-. The ethyl ether solution was dried with anhydrous $Na_2SO_4$ and filtered. The ethyl ether was evaporated off on the steam bath. The product was a light amber-colored liquid. The yield was 21 gms. or 100%. A sample of the product was analyzed for chlorine. Found 47.25% $Cl_2$. Theoretical 47.25% $Cl_2$.

*Example 2.—Preparation of trichloromethylthio ester of ethyl xanthic acid*

80.2 gms. (0.50 mole) of potassium ethyl xanthate in about 400 cc. of water was placed in a 1-liter 3-neck flask. A stirrer, a thermometer, and a dropping funnel where connected and the solution was cooled to about 15° C. While stirring and keeping the temperature below 20° C., 93.0 gms. (0.50 mole) of perchloromethylmercaptan was added dropwise from the dropping funnel. Stirring was continued for about one hour after the perchloromethylmercaptan had been added. The product was then extracted from the solution with $Et_2O$. The $Et_2O$ extract was dried with anhydrous $Na_2SO_4$ and filtered. The $Et_2O$ was evaporated from the extract on the steam bath and 100.5 gms. of orange, clear liquid product was obtained. The product was placed in a Claisen flask with 200 cc. of xylene and then stripped at 3 mm. pressure up to 105° C. (145° C. bath temperature) to remove any unreacted perchloromethyl mercaptan. There remained 94.5 gms. of orange liquid product which gave the following analysis: 35.10% S and 39.97% $Cl_2$. Theoretical is 35.45% S and 39.09% $Cl_2$. A quantity (54 gms.) of the above product was placed in a Claisen flask and distilled at 3 mm. pressure. The first fraction (6 gms.) was collected at 107°–116° C. and the second fraction or main product (39 gms.) was collected at 113°–130° C. The second fraction, or main product, gave the following analysis: 34.78% S and 40.07% $Cl_2$. Theoretical is 35.45% S and 39.09% $Cl_2$.

*Example 3.—Preparation of trichloromethylthio ester of n-butyl thioxanthic acid*

45.1 gms. (0.50 mol) of n-butyl mercaptan were placed in a 1-liter, 3-neck flask fitted with a stirrer, thermometer, and dropping funnel. 250 cc. of water containing 20.0 gms. (0.50 mole) of NaOH were added. While stirring and cooling (keeping the temperature below 10° C.), 38.1 gms. (0.50 mole) of $CS_2$ were added dropwise. Stirring was continued for about two hours and a clear light amber-colored solution was obtained. While stirring and cooling (keeping the temperature below 10° C.), 93.0 gms. (0.50 mole) of perchloromethylmercaptan were added dropwise over a period of about 30 minutes. Stirring was continued vigorously for about one hour, after the addition of perchloromethylmercaptan was completed, until the solution became acid to litmus. The solution was placed in a separatory funnel, $Et_2O$ was added and the solution was water washed twice. The $Et_2O$ extract was dried with anhydrous $Na_2SO_4$ and filtered. The $Et_2O$ was evaporated off on the steam bath and the product obtained was 149 gms. (94% of theoretical) of clear, red liquid. The liquid was placed in a Claisen flask with 200 cc. of xylene and then stripped at about 4 mm. pressure up to 125° C. bath temperature to remove any unreacted perchloromethylmercaptan.

*Example 4.—Preparation of trichloromethyl benzothiazole disulfide*

33.4 g. (0.2 mole) of mercaptobenzothiazole was added to 200 cc. of ethyl alcohol containing 4.6 g. of sodium. To this solution was added 37.2 g. of perchloromethylmercaptan in 100 cc. of ethyl alcohol. After standing at room temperature for one hour the reaction mixture was diluted with several volumes of water and the resulting mixture extracted with ether. After washing the ether layer twice with water the ether fraction was separated and filtered to remove a small amount (8 grams) of unreacted mercaptobenzothiazole. After drying, the ether solution was evaporated on the steam bath. The residue consisted of 45 g. of a dark oil which solidified on cooling to room temperature. Analysis of the product showed 26.7% chlorine and 26.2% sulfur.

*Example 5.—Trichloromethyl phenyl disulfide*

Trichloromethyl phenyl disulfide was prepared by placing 55.1 gms. (0.5 mole) of thiophenol in a 200 cc. Erlenmeyer flask and adding 92.8 gms. (0.5 mole) of perchloromethylmercaptan at room temperature. Hydrogen chloride gas began to evolve after about 5 minutes standing and the temperature gradually rose to about 60° C. The solution was left to stand overnight and then aerated with nitrogen to strip out HCl gas. Ethyl ether was added and the solution was water washed several times to remove the remaining HCl. The ether solution was dried with anhydrous $Na_2SO_4$ and filtered. The ether was evaporated off on the steam bath and the product was distilled at reduced pressure. The distilled product (103.5 gms.) was collected at 123° C. at 1 mm. pressure. A sample of the distilled product was analyzed for sulfur. Found 25.05% S. Theoretical 24.70% S.

*Example 6.—Trichloromethyl 2-ethylhexyl disulfide*

Trichloromethyl 2-ethylhexyl disulfide was prepared by placing 29.2 gms. (0.2 mole) of 2-ethylhexyl mercaptan in a 2-liter three-neck flask containing 13.6 gms. (0.2 mole) of sodium ethylate in about 200 cc. of absolute ethyl alcohol and adding dropwise 37.2 gms. (0.2 mole) of perchloromethylmercaptan while stirring and keeping the temperature below 50° C. The solution became turbid as soon as the addition of perchloromethylmercaptan was started. Stirring was continued for about 30 minutes and the solution became acid to litmus. Added about 500 cc. of water and the product separated out as a lower layer which was a dark red liquid. The product was water washed, dried with anhydrous $Na_2SO_4$, and filtered. Yield was 43.5 gms.

*Example 7*

The compounds prepared in Examples 1–6 were tested for parasiticidal activity. The values given in column I of the following table represent the percentage mortality of the test insects after 96 hours following a two-minute immersion in an 0.25% aqueous solution or suspention of the test compound.

The results in column II are given as per cent mortality of the test insect after 96 hours following bloodstream injection of 0.002 cc. of a 5% solution of the test compound.

The slide Germination technique for fungicidal testing was carried out as described by Wellman and McCallan (Contributions of Boyce Thompson Institute, vol 3, No. 3, pages 171-176) and is listed in column III as concentration of test compound in per cent to give an LD-50.

| | Column I | | Column II | | Column III | |
|---|---|---|---|---|---|---|
| | Contact Insecticidal Activity, Per Cent Kill | | Bloodstream Insect. Activity, Per Cent Kill, *Periplanitus Americana* (American Roach) | | Fungicidal Inhibiting Concentration, Per Cent | |
| | *Blatella germanica* (German Roach) | *Omelpeltus sociatus* (Milk Weed Bug) | Female | Male | *Alterneria solania* | *Sclerotinia fructicola* |
| Trichloromethyl Acetyl Disulfide | 100 | 100 | 100 | 80 | 0.0001 | 0.0001 |
| Trichloromethylthio Ester of Ethyl Xanthic Acid | 100 | 100 | 100 | 100 | 0.0001 | 0.001 |
| Trichloromethylthio Ester of n-Butyl Thioxanthic Acid | 100 | 100 | 40 | 60 | 0.001 | 0.0001 |
| Thrichloromethyl Benzothiazole Disulfide | 100 | 0 | 0 | 80 | 0.0001 | 0.001 |
| Bordeaux | | | | | 0.001 Cu | 0.001 Cu |
| Trichloromethyl Phenyl Disulfide | 100 | 100 | 60 | 100 | 0.001 | 0.001 |
| Trichloromethyl 2-Ethylhexyl Disulfide | 25 | 100 | 0 | 40 | 0.0001 | 0.001 |

These figures indicate that the compounds of this invention possess both excellent insecticidal as well as excellent fugicidal activity.

The new compounds of this invention may thus be applied to parent materials to retard or prevent fungus growth and mildew formation. Since they are exceptionally nonphytotoxic, they may be applied safely to a wide variety of plants. Some of the additional parent materials to which they may be applied for protective purposes are leather, wood, fur, wool, coated fabrics, and other substances.

The compounds of this invention which in most cases are liquids, are best distributed in the form of sprays such as in aqueous dispersions or dust compositions of the active ingredient with a powdered clay.

Since the novel compounds of this invention are insoluble in water, it is preferable to use them admixed with water-soluble wetting agents so as to be able to secure homogeneous aqueous emulsions and consequent uniformity of dispersion. The use of these wetting agents also increases the spreading action of the spray by decreasing its surface tension. This results in the securing of better contact of the spray with the surface being treated, and consequently brings the active ingredient into intimate contact with the parasite life. The concentration of active ingredient in the aqueous emulsions varies with the insect pests to be treated. In general, the aqueous emulsion contains about 5% active ingredient, and 1% wetting agent by weight. Thus, a typical emulsion concentrate formulation consists of 83% trichloromethyl acetyl disulfide, and 17% or about ⅙ by weight of the active ingredient of petroleum sulfonate of about $C_{10}$-$C_{20}$ length. This mixture can then be diluted with about 94 parts of water.

The active compounds of this invention may also desirably be made up in solid compositions. A dust composition containing about 5% active ingredient is made up by admixing the active compounds with clays such as fuller's earth, china clay, kaolin, or bentonite. Solid wettable powders for aqueous dispersion contain about 25% active ingredient, 74% clay, and about 1% wetting agent. Clay itself also acts as a spreading agent.

The term "dispersing agent" is consequently used hereafter to connote generically, the various "wetting agents" and "spreading agents" including clays that are adapted to be admixed with the active compounds of this invention in order to secure better wetting and spreading of the sprays. (See Frear, "Chemistry of Insecticides, Fungicides, and Herbicides," second edition, page 380.)

Among the water-soluble wetting agents that can be used are the sulfates of long-chain alcohols such as dodecanol up to octadecanol, sulfonated amide and ester derivatives, sulfonated aromatic and mixed alkyl-aryl sulfonate derivatives, esters of fatty acids such as the ricinoleic acid ester of sorbitol, and petroleum sulfonates of $C_{10}$ to $C_{20}$ length. The non-ionic emulsifying agents such as the ethylene oxide condensation products of alkylated phenols may also be used.

Solvents for the compounds of this invention may be utilized as auxiliary agents if desired. Among the solvents for the compounds of this invention are petroleum solvents and other organic solvents.

The compounds of this invention may also be admixed with carriers that are themselves active, such as other parasiticides, hormones, herbicides, fertilizers, and wetting agents. Stomach and contact insecticides such as the arsenates, fluorides, rotenone, and the various fish poisons and organic insecticides, such as di(p-)chlorophenyl - trichloroethane, benzene-hexachloride, and similar products may also be advantageously added.

It is to be understood that the invention is not limited to the specific examples which have been offered merely as illustrations, since other derivatives can be prepared, and that modifications may be made without departing from the spirit of the invention.

What is claimed is:

1. As new chemicals, substituted dithiotrichloro methanes corresponding to the general formula

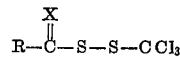

wherein R is a radical selected from the group consisting of alkyl, alkylthio, and alkoxy radicals, and X is a radical selected from the group consisting of —S— and —O—.

2. As a new chemical, trichloromethyl acetyl disulfide.

3. As a new chemical, the trichloromethylthio ester of ethyl xanthic acid.

4. As a new chemical, the trichloromethylthio ester of n-butyl thioxanthic acid.

5. A parasiticidal composition comprising a substituted dithiotrichloro methane having the general formula $$R-\overset{X}{\underset{\|}{C}}-S-S-CCl_3$$

wherein R is a radical selected from the group consisting of alkyl, alkylthio, and alkoxy radicals and X is a radical selected from the group consisting of —S— and —O—, and a carrier therefor.

6. A parasiticidal composition comprising trichloromethyl acetyl disulfide as the active ingredient and a carrier therefor.

7. A parasiticidal composition comprising the trichloromethylthio ester of ethyl xanthic acid as the active ingredient and a carrier therefor.

8. A parasiticidal composition comprising the trichloromethylthio ester of n-butyl thioxanthic acid as the active ingredient and a carrier therefor.

9. A fungicidal composition as in claim 5 wherein the carrier is a dispersing agent.

10. A fungicidal composition as in claim 5 in which the carrier is a solvent.

11. A fungicidal composition as in claim 5 in which the carrier is an aqueous emulsion.

12. A fungicidal composition as in claim 5 in which the carrier is a powdered clay.

13. A parasiticidal emulsion concentrate comprising trichloromethyl acetyl disulfide admixed with a petroleum sulfonate of about $C_{10}$–$C_{20}$ length, said petroleum sulfonate being present in an amount of about ⅕ by weight of trichloromethyl acetyl disulfide.

14. A parasiticidal dust composition comprising as new chemicals, substituted dithiotrichloro methanes corresponding to the general formula $$R-\overset{X}{\underset{\|}{C}}-S-S-CCl_3$$

wherein R is a radical selected from the group consisting of alkyl, alkylthio, and alkoxy radicals, and X is a radical selected from the group consisting of —S— and —O—, admixed with powdered bentonite.

ROGER S. HAWLEY.
ALLEN R. KITTLESON.

REFERENCES CITED

The following references are of record in the file of this patent:

UNITED STATES PATENTS

| Number    | Name    | Date          |
|-----------|---------|---------------|
| 2,150,759 | Carter  | Mar. 14, 1939 |
| 2,259,869 | Allen   | Oct. 21, 1941 |
| 2,333,084 | Flenner | Nov. 2, 1943  |

OTHER REFERENCES

Klason, Berichte, vol. 20, pages 2378 and 2379 (1887), QD1.D4.

Roark et al., "A List of Organic Compounds . . . Used as Insecticides," E–344, U. S. Dept. Agr., Bur. Entomol. and Plant Quarantine, May 1935, pages 10, 11, perchloromethyl mercaptan, $CCl_3SCl$.